(12) United States Patent
Hayashi et al.

(10) Patent No.: US 8,730,771 B2
(45) Date of Patent: May 20, 2014

(54) RECORDING/REPRODUCING DEVICE

(75) Inventors: Hisahiro Hayashi, Yamato (JP); Osamu Kawamae, Kawasaki (JP)

(73) Assignees: Hitachi—LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/430,360

(22) Filed: Mar. 26, 2012

(65) Prior Publication Data
US 2012/0250476 A1 Oct. 4, 2012

(30) Foreign Application Priority Data

Mar. 30, 2011 (JP) ................. 2011-073879

(51) Int. Cl.
*G11B 7/00* (2006.01)
(52) U.S. Cl.
USPC ............. 369/30.24; 369/30.2; 369/30.34; 369/30.48; 369/30.64; 369/53.18
(58) Field of Classification Search
USPC ........... 369/30.06, 30.2, 30.33, 30.64, 30.03, 369/30.21, 30.28, 30.32, 30.34, 30.45, 369/30.48, 30.24
See application file for complete search history.

(56) References Cited

U.S. PATENT DOCUMENTS

| | | | | |
|---|---|---|---|---|
| 5,081,618 A | * | 1/1992 | Abe | 720/691 |
| 5,818,802 A | * | 10/1998 | Menke et al. | 369/30.55 |
| 6,075,765 A | * | 6/2000 | Miyauchi et al. | 720/735 |
| 6,330,215 B1 | * | 12/2001 | Lim | 369/53.2 |
| 6,504,798 B1 | * | 1/2003 | Revis | 369/30.23 |
| 7,673,309 B2 | * | 3/2010 | Douglass et al. | 720/721 |
| 8,085,625 B2 | * | 12/2011 | Chang | 369/30.85 |
| 8,385,163 B2 | * | 2/2013 | Goyal et al. | 369/30.03 |
| 2001/0040857 A1 | * | 11/2001 | Sugaya | 369/192 |
| 2001/0055266 A1 | * | 12/2001 | Suzuki et al. | 369/200 |
| 2001/0055267 A1 | * | 12/2001 | Shimizu et al. | 369/200 |
| 2004/0105356 A1 | * | 6/2004 | Klein | 369/30.85 |

FOREIGN PATENT DOCUMENTS

JP 07-057435 3/1995

* cited by examiner

*Primary Examiner* — Thomas Alunkal
(74) *Attorney, Agent, or Firm* — McDermott Will & Emery LLP

(57) ABSTRACT

The present invention relates to a recording/reproducing device that records data on a double-sided recordable optical disk for storage and management purposes. The device includes a unit which stores a plurality of optical disks, a unit which records data onto and reproduces data from an upper side of an optical disk, a unit which records data onto and reproduces data from a lower side of an optical disk, a unit which conveys an optical disk between the disk storage unit and each recording/reproducing unit. When a request for reading data recorded on the lower side of the disk is received while the upper side is being written onto, a control unit interrupts a data recording process on the upper side, reproduces data recorded on the lower side, and after completion of reproducing the recorded data, resumes the interrupted data recording process.

13 Claims, 4 Drawing Sheets

RECORDING/REPRODUCING DEVICE

CLAIM OF PRIORITY

The present application claims priority from Japanese patent application serial No. JP 2011-073879, filed on Mar. 30, 2011, the content of which is hereby incorporated by reference into this application.

BACKGROUND OF THE INVENTION (1) Field of the Invention

The present invention relates to a recording/reproducing device that records data on an optical disk or other information recording disk for storage and management purposes.

(2) Description of the Related Art

A technology related to the present invention is disclosed, for instance, in JP-A-1995-57435. The technology aims to improve the cost-effectiveness and reliability of a large-capacity optical disk memory device that uses a double-sided recordable optical disk. The technology uses a recording/reproducing unit having a disk driver that includes an optical head for only one side of the optical disk for reading and writing purposes. The technology also uses a control unit having a buffer memory and an index memory. The buffer memory is capable of storing an amount of data at least equivalent to the storage capacity of one side of the optical disk. The index memory stores index information, for instance, about the name of data written in the buffer memory or written on the optical disk. The technology also uses a control computer that temporarily stores input data in the buffer memory. Further, at a predetermined point of time at which the device pauses, the control computer detects the amount of data recorded in the buffer memory. If the detected amount of recorded data reaches a predetermined amount, the control computer transfers the entire recorded data to the disk driver of the recording/reproducing unit and writes it onto the optical disk, deletes the transferred data from the buffer memory, and rewrites the index information in the index memory.

SUMMARY OF THE INVENTION

According to a proposal described in JP-A-1995-57435, a large-capacity buffer memory included in a recording/reproducing device stores data to be recorded onto an optical disk, and retains the stored data even after it is recorded onto the optical disk as far as the buffer memory has a reserve capacity. Therefore, data recently recorded onto the optical disk can be read from the buffer memory. Further, when a read request is received for data recorded on a lower side of a double-sided recordable disk while its upper side is being written onto, the data recorded on the lower side can be read from the buffer memory. This means that the data recorded on the lower side can be read even when the upper side is being written onto. However in this method, no consideration is given to a case where a read request is received for data that had already been deleted from the buffer memory.

In view of the above problem, the present invention has been made to solve it by using a configuration defined by the appended claims.

More specifically, there is provided a recording/reproducing device including, for example, a unit which stores a plurality of information recording disks, a unit which records data onto and reproduces data from the upper side of an information recording disk, a unit which records data onto and reproduces data from the lower side of an information recording disk, a unit which conveys an information recording disk between the disk storage unit and each recording/reproducing unit, and a unit which interrupts a data recording process on one side, reproduces data recorded on the other side, and after completion of reproducing the recorded data, resumes the interrupted data recording process.

When a request for reading data recorded on a first side of a double-sided recordable optical disk is received while a second side is being written onto, an embodiment of the present invention can interrupt the ongoing recording process to read the data recorded on the first side. This makes it possible to read data without waiting for the completion of a data recording process.

DETAILED DESCRIPTION OF THE EMBODIMENTS

Embodiments of the present invention will now be described with reference to the accompanying drawings.

First Embodiment

Figure 1:
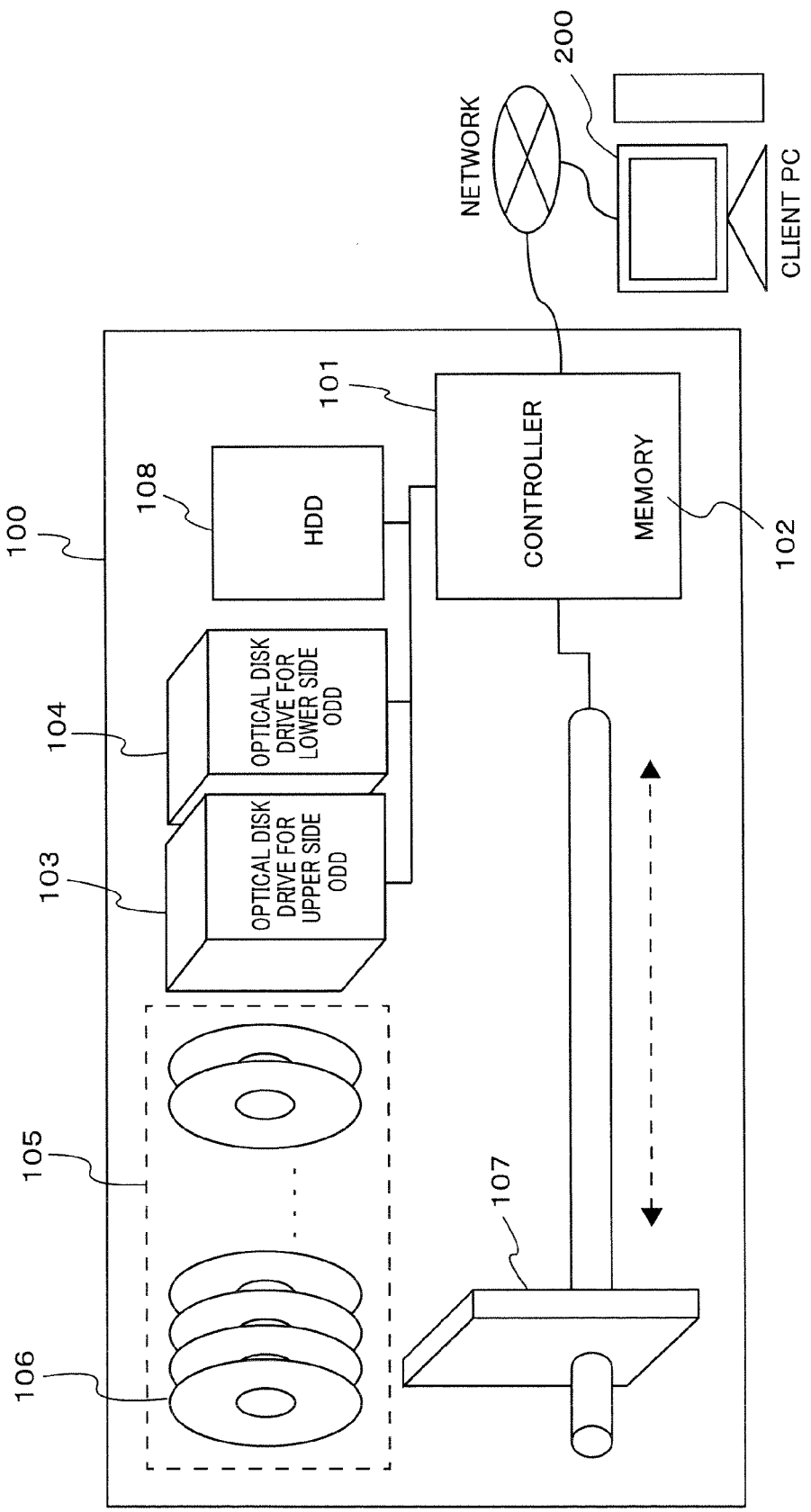
FIG. 1 is a block diagram illustrating a recording/reproducing device.

The configuration of a recording/reproducing device according to a first embodiment of the present invention will now be described. FIG. 1 is a block diagram illustrating the overall configuration of the recording/reproducing device according to the first embodiment.

The recording/reproducing device 100 includes a controller 101, which provides overall control of the recording/reproducing device 100; a memory 102, which is attached to the controller 101; an upper side optical disk drive 103, which records data onto and reproduces data from the upper side of an optical disk; a lower side optical disk drive 104, which records data onto and reproduces data from the lower side of an optical disk; a disk storage unit 105, which stores a large number of optical disks; optical disks 106, which are information recording media; a conveyor 107, which conveys an optical disk 106 from the disk storage unit 105 to the optical disk drive 103, 104 or conveys an optical disk 106 between the optical disk drives 103, 104; and a hard disk drive (hereinafter referred to as HDD) 108, which records a large amount of data.

The recording/reproducing device 100 is connected to a client PC 200 through a network as a NAS (network attached storage), a file server, or other recording/reproducing device and exchanges data with the client PC 200. Data transmitted from a user is stored on the HDD 108. The recording/reproducing device 100 operates so that, for example, infrequently-accessed data recorded on the HDD 108 is automatically recorded on an optical disk specially designed for long-term data storage. The infrequently-accessed data is then deleted from the HDD 108 to ensure a free space on the HDD 108. Data storage locations are entirely managed by the recording/reproducing device 100. For example, the recording/reproducing device 100 knows whether user data is recorded on the HDD 108 or on an optical disk. Upon receipt of a read request from the user, the recording/reproducing device 100 reads requested data from the associated information recording medium.

The present embodiment will be described with reference to a case where a request for reading data recorded on the lower side of a double-sided recordable optical disk 106 is received while data is being recorded on the upper side of the optical disk 106. As the upper side of the optical disk 106 is being written onto, the optical disk 106 is loaded in the upper side optical disk drive 103. When the recording/reproducing device 100 receives a request for reading data recorded on the lower side of the optical disk 106 from the client PC 200 or other higher-level device, the controller 101 checks a data writing state of the optical disk 106 and allows a data write operation to be performed up to a point at which the data write operation can be interrupted. The interruptible point can be determined, for instance, on a data size basis or on an individual file basis. When the interruptible point is reached, the controller 101 interrupts the write operation on the upper side optical disk drive 103 and records an address of the interruption point in the memory 102. The conveyor 107 then conveys the optical disk 106 from the upper side optical disk drive 103 to the lower side optical disk drive 104. Next, the lower side optical disk drive 104 reads the requested data from the optical disk 106 and transfers the read data to the client PC 200. Upon completion of the data read operation, the conveyor 107 unloads the optical disk 106 from the lower side optical disk drive 104 and conveys it to the upper side optical disk drive 103. Upon completion of the conveyance operation, the upper side optical disk drive 103 resumes the data write operation from the interruption point recorded in the memory 102.

The present embodiment has been described on the assumption that a request for accessing the lower side is received while the upper side is being written onto. However, the same also holds true when a request for accessing the upper side is received while the lower side is being written onto. Further, when a currently performed recording process is a finalizing process or other special process, the controller 101 may decide to start a read process upon completion of the recording process. Furthermore, when the remaining amount of data to be recorded is small, the controller 101 may decide to complete the recording process before starting a read operation.

The present embodiment has also been described on the assumption that a process is performed to read a side of one disk while the other side of the same disk is being written onto. However, the same process may be performed when a request for reading a side (upper side) of a disk is received while the same side (upper side) of another disk is being written onto. Specifically, a recording process for an optical disk is interrupted and the point of interruption is recorded. This optical disk is then conveyed to the disk storage unit. Next, another optical disk designated by the read request is loaded into the emptied optical disk drive to read requested data. Upon completion of the data read operation, the optical disk is unloaded from the optical disk drive and conveyed to the disk storage unit. The optical disk whose read operation was interrupted is then loaded into the optical disk drive to resume the recording process.

Further, if a request is received for reading a lower side of a first optical disk while its upper side is being written onto and the lower side optical disk drive is being used to perform a recording process on a second optical disk, the read request may be preferentially executed, for instance, by interrupting the recording processes for the first and second optical disks and conveying the second optical disk to the disk storage unit. The recording/reproducing device records the interruption point of the second disk as with the first optical disk designated by the read request.

Figure 2:
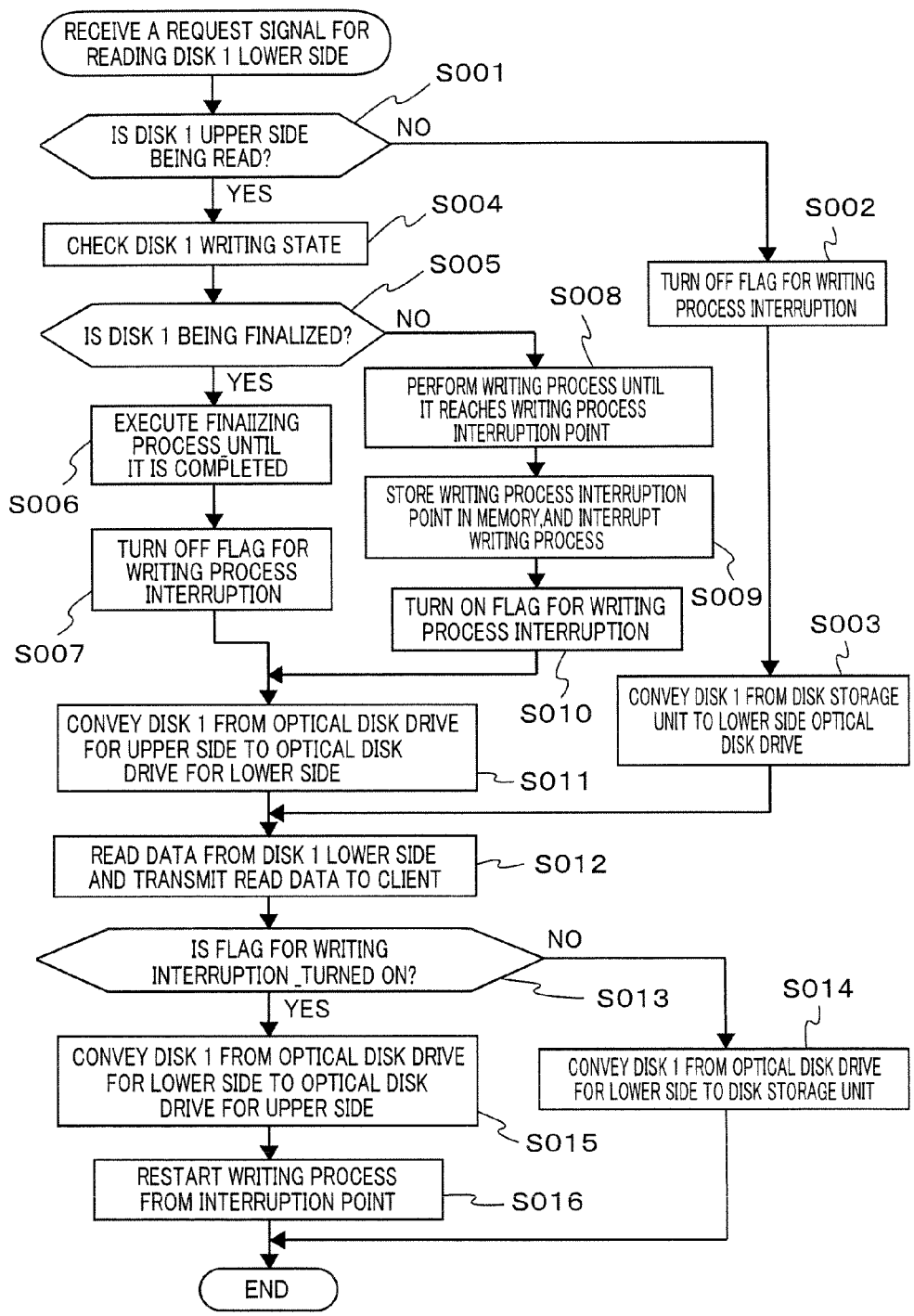
FIG. 2 is a flowchart illustrating a process according to a first embodiment of the present invention.

FIG. 2 is a flowchart illustrating a process according to the present embodiment. First, upon receipt of a request for reading the lower side of a disk 1, the recording/reproducing device performs step S001 to judge whether the upper side of the disk 1 is being written onto. If the upper side of disk 1 is not being written onto, there is no need to interrupt a recording process. Therefore, the recording/reproducing device turns off a recording process interruption flag in step S002, and then conveys the disk 1 from a place where the disk 1 is stored to the lower side optical disk drive in order to read data from the disk 1 (step S003). Next, the recording/reproducing device proceeds to step S012, reads data from the lower side of the disk 1, and transmits the read data to a requester. The recording/reproducing device then proceeds to step S013 and checks the recording process interruption flag. In this instance, as the recording process is not interrupted, the recording/reproducing device proceeds to step S014 and terminates its operation by conveying the disk 1 from the lower side optical disk drive to the disk storage unit.

Next, a case where the upper surface of the disk 1 is being written onto in step S001 is considered. If the upper side of the disk 1 is under a recording process, the recording/reproducing device checks the recording process performed on the disk 1 in step S004, and then performs step S005 to judge whether a finalizing process is being performed. If the finalizing process is being performed, the recording/reproducing device waits until the finalizing process is completed (step S006), and then turns off the recording process interruption flag (step S007). If, on the other hand, the finalizing process is not being performed, the recording/reproducing device allows the recording process to be continued up to a recording process interruption point (step S008), records a recording process interruption point in the memory, and interrupts the recording process (step S009). The recording/reproducing device then turns on the recording process interruption flag (step S010). Next, the recording/reproducing device conveys the disk 1 from the upper side optical disk drive to the lower side optical disk drive (step S011), and then reads data from the lower side of the disk 1 and transmits the read data to the requester in step S012. Next, the recording/reproducing device checks the recording process interruption flag in step S013. If the recording process interruption flag is off, the recording/reproducing device terminates its operation by conveying the disk 1 from the lower side optical disk drive to the disk storage unit (step S014). If, on the other hand, the recording process interruption flag is on, the recording/reproducing device conveys the disk 1 from the lower side optical disk drive to the upper side optical disk drive in step S015, and resumes the interrupted recording process in step S016 from the recording process interruption point.

According to the first embodiment described above, when the recording/reproducing device receives a request for accessing data recorded on one side of a double-sided optical disk while its opposite side is being written onto, desired data can be read and transferred without causing the user to wait until the recording process is completed. Further, after completing the data transfer, the optical disk can be returned to the optical disk drive that had been used for the recording process to resume recording from the interruption point. Furthermore, since side-specific optical disk drives are used, the necessity for a disk reversal mechanism is eliminated.

Second Embodiment

Figure 3:
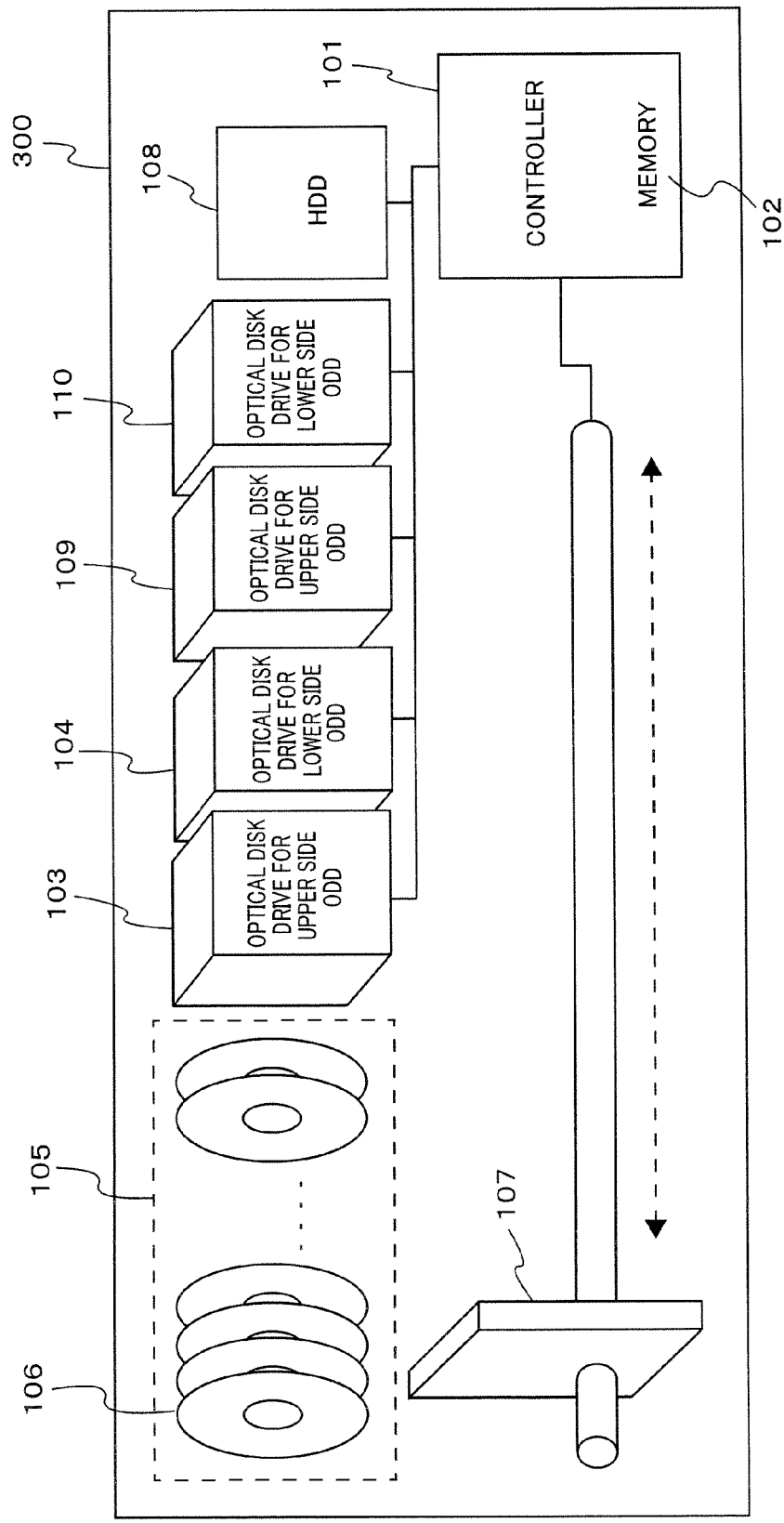
FIG. 3 is a block diagram illustrating a recording/reproducing device having a plurality of drives for recording data onto and reproducing data from each side of a disk.

A second embodiment of the present invention will now be described. FIG. 3 is a block diagram illustrating a recording/ reproducing device 300 according to the second embodiment, which has a plurality of optical disk drives for recording data onto and reproducing data from each side of an optical disk. Elements outside the recording/reproducing device are omitted in the figure and the following description. Components designated by the same reference numerals as those shown in FIG. 1 are identical with the corresponding components shown in FIG. 1. An upper side optical disk drive 109 is identical with the upper side optical disk drive 103. A lower side optical disk drive 110 is identical with the lower side optical disk drive 104. All these optical disk drives are controlled by the controller 101. The following description deals with a case where a failure occurs in the recording/reproducing device 300 while a read process is being performed by an optical disk drive.

If, for instance, the controller 101 detects a failure during data read process by the upper side optical disk drive 103, the controller 101 investigates the cause of the failure. If the optical disk drive 103 is attributable to the failure, the controller 101 memorizes the position of the data up to which the optical disk drive 103 has normally read from the optical disk. The conveyor 107 unloads the optical disk from the upper side optical disk drive 103 and conveys the optical disk to the upper side optical disk drive 109, which is another upper side optical disk drive. The upper side optical disk drive 109 then resumes the data read process from the memorized position to which data has been normally read.

With such system, data desired by the user can be read even if an optical disk drive becomes faulty. Although the present embodiment has been described in connection with an operation performed to read the upper side of an optical disk, the same also holds true for an operation performed to read the lower side. Further, the same also holds true for a write operation. However, when a write operation is performed, a currently recorded optical disk may become unavailable depending on the failure of the optical disk drive. In such an instance, it is necessary to perform the entire recording process on a new optical disk.

Further, since a plurality of optical disk drives are prepared for each side of an optical disk, the controller 101 can select an appropriate drive to enhance the efficiency of a recording/reproducing process when the recording/reproducing device 300 reads data from or writes data onto an optical disk. For example, the controller 101 can select a drive having a low error rate or an unused drive for each process to enhance efficiency.

Although the present embodiment has been described on the assumption that two optical disk dives are employed for each side of an optical disk, the number of optical disk drives is not limited to two. Three or more optical disk drives may be used for each side of optical disks. Further, the number of upper side optical disk drives need not always be the same as the number of lower side optical disk drives.

Third Embodiment

A third embodiment of the present invention will now be described. The following description deals with a case where the recording/reproducing device having a plurality of optical disk drives for each side of optical disks is to read data that is distributively recorded on a plurality of optical disks. The recording/reproducing device according to the third embodiment has the same configuration as the recording/reproducing device according to the second embodiment. In the third embodiment, the number of optical disk drives available for each side of an optical disk is not limited to two, as is the case with the second embodiment. As an example of a method of distributively recording data onto a plurality of optical disks, the data may be divided into pieces in accordance with the size of data recordable onto each optical disk and the divided pieces of data may be recorded onto the optical disks. Since the recording/reproducing device includes a plurality of optical disk drives, a high-speed process can be performed by simultaneously recording data onto a plurality of optical disks. Another distributive recording method would be to use, for example, RAID (Redundant Arrays of Independent Disks). When RAID is used, for example, each data block can be distributively recorded onto a plurality of optical disks together with an error-correcting code to enhance the reliability of data. When the former method is used, data is consecutively recorded on individual disks. Therefore, the data can be read, for example, by first reading the first disk and then reading the second disk. On the other hand, when the latter method is used, the data needs to be read by simultaneously reading data from the plurality of optical disks. More specifically, if, for instance, data designated by a read request is distributively written on three optical disks, each of the three optical disks needs to be inserted into an optical disk drive in order to effectively read the data. If the optical disk drive to be used is already used to perform a recording process, it is necessary to interrupt the recording process as is the case with the first embodiment, eject the loaded optical disk, insert an optical disk designated by the read request into an optical disk drive, and perform a data read process. As three optical disks are used in the present embodiment, up to three recording processes need to be interrupted. Subsequently, after completion of the data read process, it is necessary to eject the optical disk used for the read process from the optical disk drive and insert the optical disk previously used for the recording process. Finally, all the interrupted recording processes are resumed. The same also holds true in a situation where one side of an optical disk is designated by a read request while its other side is being written onto.

By interrupting a plurality of recording processes as above, a read process can be performed even for data distributively recorded on a plurality of optical disks.

Fourth Embodiment

Figure 4:
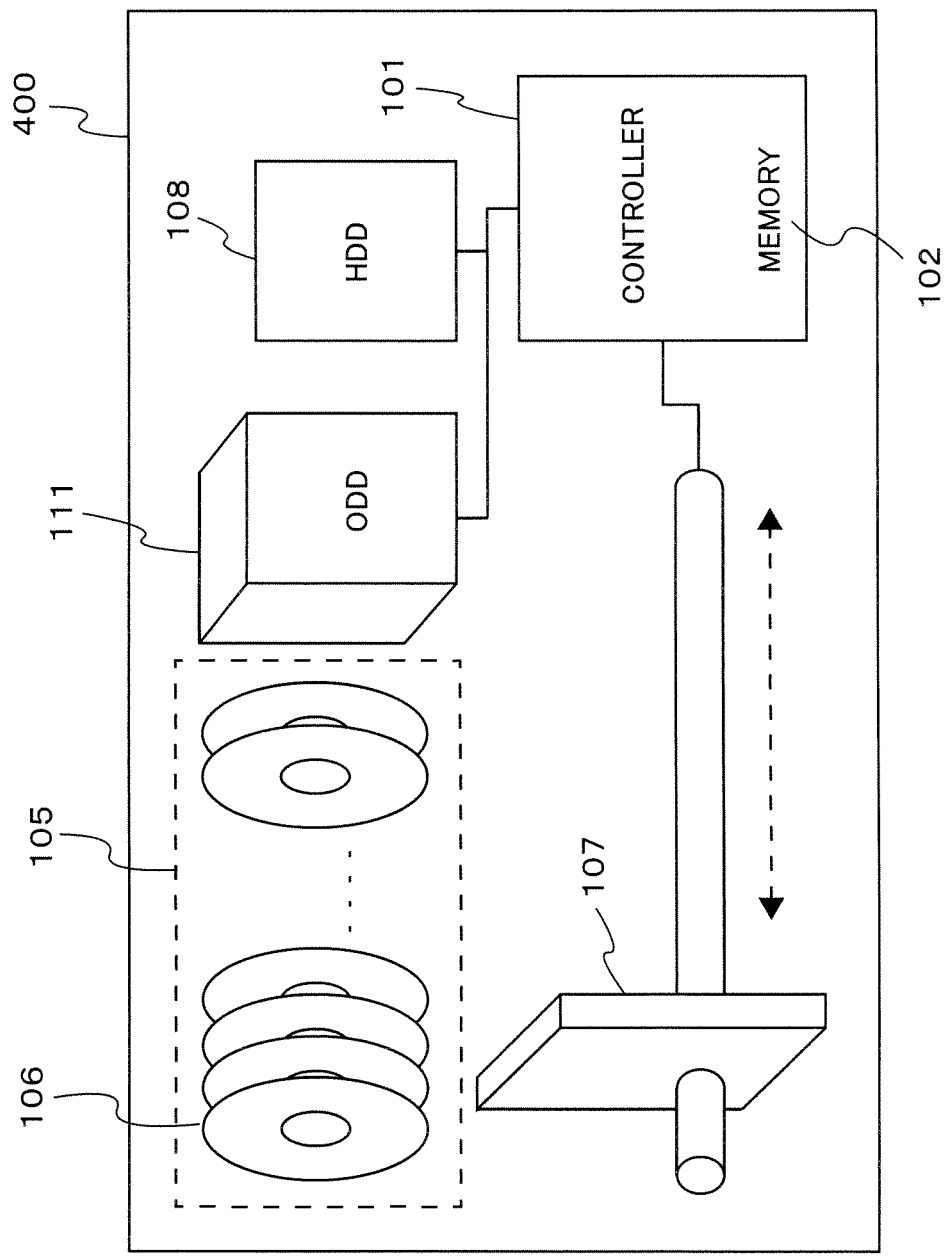
FIG. 4 is a block diagram illustrating a recording/reproducing device capable of recording data onto and reproducing data from only one side.

A fourth embodiment of the present invention will now be described. FIG. 4 is a block diagram illustrating a recording/reproducing device 400 having one optical disk drive capable of recording data onto and reproducing data from only one side. Elements outside the recording/reproducing device are omitted in the figure and the following description. Components designated by the same reference numerals as those shown in FIG. 1 are identical with the corresponding components shown in FIG. 1. The reference numeral 111 denotes an optical disk drive. This optical disk drive 111 is also controlled by the controller 101. The following description deals with a case where a request for reading an optical disk placed in the disk storage unit 105 is received while another optical disk is being written onto.

When a request for reading data recorded on an optical disk placed in the disk storage unit 105 is received from the client PC 200 or other higher-level device while another optical disk is being written onto in the optical disk drive 111, the controller 101 checks the recording operation of the optical disk drive 111, determines an interruptible point in the same manner as described in connection with the first embodiment, and performs a write operation until the interruptible point is reached. When the write operation is performed to the interruptible point, the controller 101 controls the optical disk drive 111 to terminate its write operation and records the point of interruption in the memory 102. The controller 101 then conveys to the disk storage unit 105 the optical disk loaded and being written onto in the optical disk drive 111, and transports the optical disk designated by the read request into the optical disk drive 111. Finally, the controller 101 reads the data recorded on the transported optical disk.

Even when the optical disk drive 111 is being used for a write process, performing the above-described operation makes it possible to read data desired by the user without causing the user to wait for the completion of the write process.

It should be understood that the present invention is not limited to the foregoing embodiments. Various modifications and equivalent arrangements are intended to be included within the spirit and scope of the appended claims. The foregoing embodiments have been described in detail in order to make the present invention easily understood. The present invention is not limited to the embodiments that include all the above-described components. Some of the components included in a certain embodiment may be replaced by the components of another embodiment. Further, the components included in a certain embodiment may be added to the components included in another embodiment. Furthermore, some of the components included in each embodiment may be removed, replaced by different components, or combined with additional components.

Some or all of the above-described components, functions, processing capabilities, processing units, and the like may be implemented by an integrated circuit or other hardware. Further, each of the above-described components, functions, and the like may be implemented by software, that is, by allowing a processor to interpret and execute a program that implements a relevant function.

Control lines and information lines considered to be necessary for description are shown, and it is not always true that all control lines and information lines necessary for each product are shown. It may be considered actually that almost all components are interconnected.

What is claimed is:

1. A recording/reproducing device that records information onto and reproduces information from a double-sided information recording disk, the information recording disk having a first side and a second side, the first side and the second side corresponding respectively to an upper surface and an lower surface or vice versa, the recording/reproducing device comprising:
   a first recording/reproducing unit which records information onto the first side of the information recording disk and/or reproduces information therefrom;
   a second recording/reproducing unit which records information onto the second side of the information recording disk and/or reproduces information therefrom;
   a disk storage unit which stores the information recording disk;
   a first conveyor unit which conveys the information recording disk between the disk storage unit and the first recording/reproducing unit;
   a second conveyor unit which conveys the information recording disk between the disk storage unit and the second recording/reproducing unit; and
   a control unit which controls each of the units;
   wherein, while the first recording/reproducing unit or the second recording/reproducing unit is performing a data recording process on the first side or the second side of the information recording disk, the control unit interrupts the data recording process, causes the first conveyor unit or the second conveyor unit to convey the information recording disk to a recording/reproducing unit different from the recording/reproducing unit currently engaged in the data recording process, and allows the different recording/reproducing unit to perform a data reproducing process on data recorded on a side different from the side of the information recording disk on which the data recording process was performed.

2. The recording/reproducing device according to claim 1, wherein, upon completion of the data reproducing process, the control unit causes the first conveyor unit and the second conveyor unit to convey the information recording disk from the recording/reproducing unit whose data reproducing process has been completed to the recording/reproducing unit whose data recording process was interrupted, and resumes the data recording process on the side of the information recording disk from a point at which the data recording process was interrupted.

3. A recording/reproducing device that records information onto and reproduces information from a double-sided information recording disk, the information recording disk having a first side and a second side, the first side and the second side corresponding respectively to an upper surface and an lower surface or vice versa, the recording/reproducing device comprising:
   a first recording/reproducing unit which records information onto the first side of the information recording disk and/or reproduces information therefrom;
   a second recording/reproducing unit which records information onto the second side of the information recording disk and/or reproduces information therefrom;
   a disk storage unit which stores the information recording disk;
   a first conveyor unit which conveys the information recording disk between the disk storage unit and the first recording/reproducing unit;
   a second conveyor unit which conveys the information recording disk between the disk storage unit and the second recording/reproducing unit;
   a third conveyor unit which conveys the information recording disk between the first recording/reproducing unit and the second recording/reproducing unit; and a control unit which controls each of the units;
   wherein, while the first recording/reproducing unit or the second recording/reproducing unit is performing a data recording process on the first side or the second side of the information recording disk, the control unit interrupts the data recording process, causes the third conveyor unit to convey the information recording disk to the recording/reproducing unit different from the recording/reproducing unit currently engaged in the data recording process, and allows the different recording/reproducing unit to perform a data reproducing process on data recorded on the side different from the side of the information recording disk on which the data recording process was performed.

4. The recording/reproducing device according to claim 3, wherein, upon completion of the data reproducing process, the control unit causes the third conveyor unit to convey the information recording disk from the recording/reproducing unit whose data reproducing process has been completed to the recording/reproducing unit whose data recording process was interrupted, and resumes the data recording process on the side of the information recording disk from a point at which the data recording process was interrupted.

5. A recording/reproducing device that records information onto and reproduces information from a double-sided information recording disk, the information recording disk having a first side and a second side, the first side and the second side corresponding respectively to an upper surface and an lower surface or vice versa, the recording/reproducing device comprising:
- a first recording/reproducing unit which records information onto the first side of the information recording disk and/or reproduces information therefrom;
- a second recording/reproducing unit which records information onto the second side of the information recording disk and/or reproduces information therefrom;
- a disk storage unit which stores the information recording disk;
- a first conveyor unit which conveys the information recording disk between the disk storage unit and the first recording/reproducing unit;
- a second conveyor unit which conveys the information recording disk between the disk storage unit and the second recording/reproducing unit; and
- a control unit which controls each of the units;
- wherein, while the first recording/reproducing unit is performing a data recording process on a first side of a first information recording disk, the control unit interrupts the data recording process, causes the first conveyor unit to convey the first information recording disk to the disk storage unit, causes the first conveyor unit to convey a second information recording disk stored in the disk storage unit to the first recording/reproducing unit, and performs a data reproducing process on data recorded on a first side of the second information recording disk.

6. The recording/reproducing device according to claim 5, wherein, upon completion of the data reproducing process, the control unit causes the first conveyor unit to convey the second information recording disk from the first recording/reproducing unit to the disk storage unit and convey the first information recording disk from the disk storage unit to the first recording/reproducing unit, and resumes the data recording process from a point at which the data recording process was interrupted.

7. The recording/reproducing device according to claim 1, wherein a point at which the data recording process is to be interrupted is determined on an individual file basis.

8. The recording/reproducing device according to claim 1, wherein a point at which the data recording process is to be interrupted is determined on a predefined data size basis.

9. The recording/reproducing device according to claim 1, wherein, when the data recording process is a finalizing process, the control unit performs the data reproducing process upon completion of the finalizing process.

10. The recording/reproducing device according to claim 1, wherein, if the amount of data already recorded in the data recording process is equal to or larger than a predetermined amount, the control unit completes the data recording process and then performs the data reproducing process.

11. The recording/reproducing device according to claim 1, wherein, when a plurality of recording/reproducing units are installed for each of the first and second sides of the information recording disk and a failure occurs while one of the recording/reproducing units is performing a recording and/or reproducing process, the control unit resumes the recording and/or reproducing process by using a recording/reproducing unit other than the recording/reproducing unit in which the failure occurred.

12. The recording/reproducing device according to claim 1, wherein, when a plurality of recording/reproducing units are installed for each of the first and second sides of the information recording disk, the control unit interrupts the recording process of one or more of the recording/reproducing units, and performs a reproducing process on an information recording disk by using one or more of the recording/reproducing units whose recording process has been interrupted.

13. The recording/reproducing device according to claim 12, wherein, upon completion of the reproducing process, the control unit resumes the recording process from a point at which the recording process was interrupted.

* * * * *